United States Patent
Chamberlain et al.

(10) Patent No.: US 7,627,812 B2
(45) Date of Patent: Dec. 1, 2009

(54) VARIABLE FORMATTING OF CELLS

(75) Inventors: Benjamin C. Chamberlain, Redmond, WA (US); Bruce C. Jones, Bellevue, WA (US); Christopher M. Street, Redmond, WA (US); David F. Gainer, Redmond, WA (US); Eric B. Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/260,520

(22) Filed: Oct. 27, 2005

(65) Prior Publication Data

US 2007/0101252 A1  May 3, 2007

(51) Int. Cl.
*G06F 17/00* (2006.01)
*G09F 17/00* (2006.01)
(52) U.S. Cl. .................. 715/217; 715/214; 715/219; 715/220
(58) Field of Classification Search .......... 715/212–220
See application file for complete search history.

(56) References Cited

U.S. PATENT DOCUMENTS

| | | | | |
|---|---|---|---|---|
| 5,566,291 A * | 10/1996 | Boulton et al. | ............ | 715/709 |
| 5,598,519 A | 1/1997 | Narayanan | ............ | 395/765 |
| 5,883,635 A | 3/1999 | Rao et al. | ............ | 345/440 |
| 6,085,202 A | 7/2000 | Rao et al. | ............ | 707/509 |
| 6,349,315 B1 * | 2/2002 | Sonoyama et al. | ............ | 715/209 |
| 6,496,832 B2 | 12/2002 | Chi et al. | ............ | 707/102 |
| 6,854,103 B2 | 2/2005 | Teene | ............ | 716/11 |
| 6,867,788 B1 | 3/2005 | Takeda | ............ | 345/630 |
| 7,363,306 B1 * | 4/2008 | Hao et al. | ............ | 707/10 |
| 2002/0010713 A1 * | 1/2002 | Egilsson | ............ | 707/504 |
| 2004/0060001 A1 | 3/2004 | Coffen et al. | ............ | 715/503 |
| 2004/0181507 A1 | 9/2004 | Megiddo et al. | ............ | 707/1 |
| 2004/0205450 A1 * | 10/2004 | Hao et al. | ............ | 715/500 |
| 2005/0125377 A1 | 6/2005 | Kotler et al. | ............ | 707/1 |

FOREIGN PATENT DOCUMENTS

WO   WO 00/73937   7/2000

OTHER PUBLICATIONS

Ed Huai-hsin Chi, et al., "A Spreadsheet Approach to Information Visualization", http://www2.parc.com/istl/projects/uir/pubs/items/UIR-1997-03-Chi-UIST97-Spreadsheet.pdf.
Ed Chi, "Exploring Visual Representations", http://www-users.cs.umn.edu/~echi/papers/infovis97/spread/node18.html, Jul. 22, 1997.
Lloyd A. Treinish, "A Function-Based Data Model for Visualization", http://researchweb.watson.ibm.com/people/l/lloydt/dm/function/dm_fn.htm.

* cited by examiner

*Primary Examiner*—Doug Hutton
*Assistant Examiner*—Tionna Smith
(74) *Attorney, Agent, or Firm*—Merchant & Gould; Ryan T. Grace

(57) ABSTRACT

Variable formatting for cells in computer spreadsheets, tables, and other documents is provided. For a selected range of cells, cell formats vary with the value in each cell (or an associated value). Formats can include color-scale backgrounds, in-cell elements (e.g., icons and data bars), and other cell formats that can be varied with a value.

19 Claims, 9 Drawing Sheets

FIG. 6B

Format all cells based on their values:

Format Style: Icon Sets

Display each icon according to these rules:

| Icon | | Value | | Type |
|---|---|---|---|---|
| ● | when value is ≥ | | | Percent |
| ◐ | when < 80 and ≥ | 80 | | Percent |
| ◑ | when < 60 and ≥ | 60 | | Percent |
| ◔ | when < 40 and ≥ | 40 | | Percent |
| ○ | when < | 20 | | |

Icon Style: Icon Style   ☐ Reverse Icon Order   ☐ Show Icon Only

FIG. 6A

| A | |
|---|---|
| 1 | ● 6 |
| 2 | ◐ 16 |
| 3 | ◐ 17 |
| 4 | ○ 25 |
| 5 | ◑ 9 |
| 6 | ◐ 12 |
| 7 | ● 9 |
| 8 | ◐ 11 |
| 9 | ◑ 18 |
| 10 | ● 8 |
| 11 | ● 4 |
| 12 | ◔ 19 |
| 13 | ○ 28 |
| 14 | ◔ 22 |
| 15 | ◔ 18 |
| 16 | |

VARIABLE FORMATTING OF CELLS

BACKGROUND

Data visualization techniques enable users of data to scan and quickly comprehend large quantities of information. Such techniques may also aid in alerting users to anomalies and other data of interest. Visualization tools can include charts, graphs, and reports that collect, summarize, and/or otherwise transform data into meaningful shapes, colors, and patterns. Closer to the source, data visualization has also included the use of conditional formatting in spreadsheets, which frequently serve as receptacles of raw data.

Conditional formatting has enabled users to modify the look of data in place, changing the appearance of individual spreadsheet or table cells based on the content of the cell (or some other determining condition). FIG. 2 depicts a prior art range of cells 201 in a spreadsheet, the cells of which have been conditionally formatted. Here, cell A1 provides an example of the default or unformatted version of a cell. Cell A2 provides an example of a first conditionally formatted cell, and cell A4 provides an example of a second conditionally formatted cell. Cells A2 and A4 have automatically received new formatting based on a condition associated with the cells.

FIG. 3 depicts a prior art dialog 301 where formats conditioned upon values being within certain ranges have been selected. The two conditions supplied here (and applied to the range of cells 201) format cells in a particular fashion when the value contained within each is evaluated as being between a certain range (10 and 20 for condition 1, 15 and 30 for condition 2). The conditions utilized in conditional formats are limited to two possible Boolean outputs, TRUE or FALSE. If the condition supplied evaluates to TRUE, then the format is applied. If the condition supplied evaluates to FALSE, then the format is not applied.

Dialog 301 demonstrates that, while useful, conditional formatting can be limiting as to certain available formats (e.g., font, cell color, borders). Furthermore, a given range of cells is provided a maximum number of conditional formats that can be applied, certainly no more than three conditions, each providing no more than one possible format when evaluating to TRUE. These limitations prevent conditionally formatted cells from fully realizing their potential as analysis and reporting tools.

There is a need in the art for the ability to vary cell formats in tables and spreadsheets and to apply advanced formats. Such formatting should not be restricted to a limited set of formats based on Boolean conditions.

SUMMARY

One or more embodiments enable variable formatting, which provides methods for applying a varying format to a range of cells in a spreadsheet, table, or other electronic document. Formats are applied which vary based on the cell value (or an associated value). Examples include a variable format command being applied to a range of cells that varies the background color of the cell along a color scale varying with a value in the cell. Additional examples include varying the size (or other aspect) of a shape such as a data bar that is placed in the cell, and varying the selection of an in-cell icon based on a value associated with a cell.

Additional embodiments provide systems that may implement variable formatting, systems that include a display, processor, and memory storing instructions to execute on the processor.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

FIG. 6A depicts a range of cells formatted using icon style variable formatting according to one or more embodiments.

FIG. 6B depicts an input dialog with which a user may specify the variable formatting parameters for FIG. 6A according to one or more embodiments.

DETAILED DESCRIPTION

Formats need not be evaluated using only TRUE or FALSE as determinative results. Instead, cell formats applied can vary depending upon an associated value (e.g., the value in the cell itself), providing more formats which may be more meaningful to a user. Formats may be applied to a range of cells, where a format value is determined for each cell in the range, and one or more aspects of the format vary based on the format value. For example, as the value in a cell increases, the background color or shade is adjusted, or the size of an in-cell data bar grows, or the selection of an in-cell icon changes.

Figure 1:
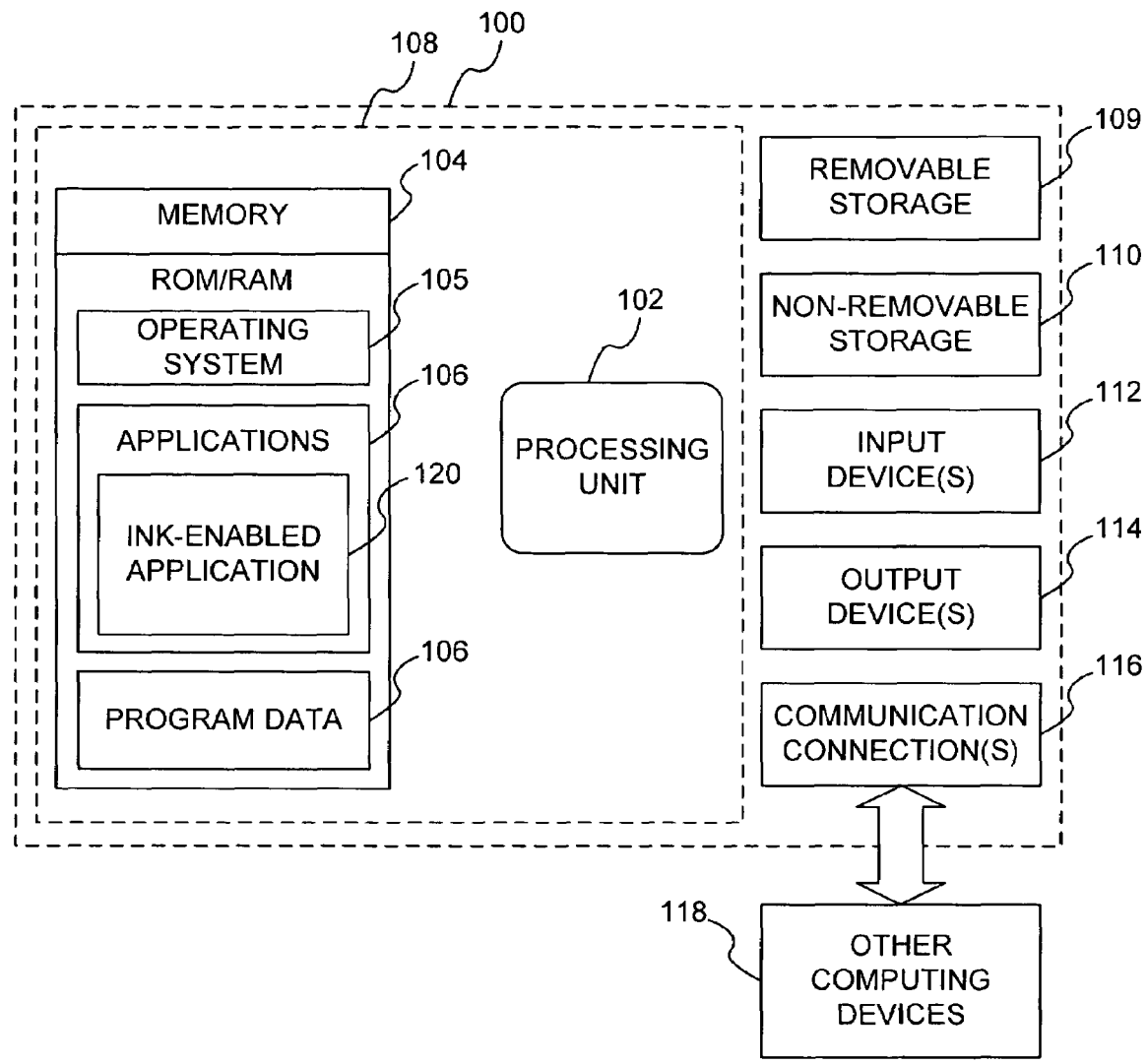
FIG. 1 depicts an exemplary operating environment in which one or more embodiments may be implemented.
Figures 2, 3:
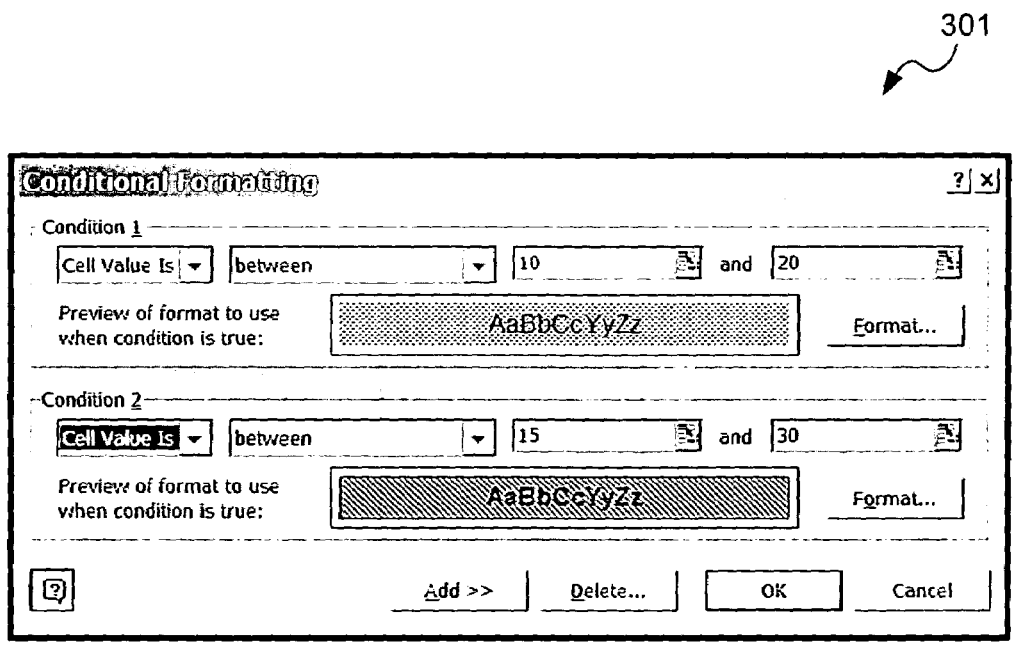
FIG. 2 depicts a prior art example of a range of conditionally formatted cells in a spreadsheet.
FIG. 3 depicts a prior art example of a dialog for conditionally formatting cells.

FIG. 1 depicts an exemplary operating environment in which one or more embodiments may be implemented. The operating environment may comprise computing device 100 which may work alone or with other computing devices 118. Computing device 100 may comprise memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoded with a computer program of instructions for executing a process on computing device 100. The computer program product may also be a propagated signal on a carrier readable by a computing system and subsequently stored on a computer readable medium on computing device 100.

With reference to FIG. 1, the embodiment shown may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. Examples of operating system 105 are found in the family of WINDOWS operating systems from MICROSOFT CORPORATION of Redmond, Wash. In one embodiment, applications 106 may include a spreadsheet application 120.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) keys, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figures 4A, 4B:
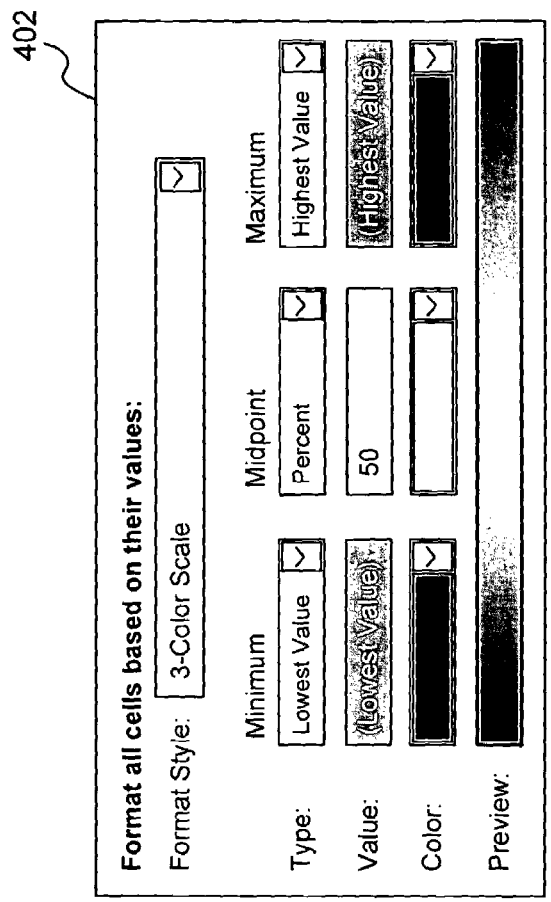
FIG. 4A depicts a range of cells formatted using color scale style variable formatting according to one or more embodiments.
FIG. 4B depicts an input dialog with which a user may specify the variable formatting parameters for FIG. 4A according to one or more embodiments.

FIG. 4A depicts a range of cells 401 formatted using color scale style variable formatting. Rather than being limited to three output formats (i.e. three conditions, one format each), the cells have a variable format applied that may produce any number of distinct cell formats. The cells within range 401 have values that are ordered from lowest to highest. Here, the value contained in each cell is used to determine a background color with which to fill the cell. Three colors are specified for the two endpoints and the midpoint, and the intervening colors are computed for values falling in between. The endpoint values within the range are held within cells A1 and A15. The background colors for each cell range from red (A1) to yellow (A8) to green (A15). Cells A2-A7 have background colors selected from a color scale between red and yellow, and cells A9-A14 have background colors selected from a color scale between yellow and green.

FIG. 4B depicts an input dialog 402 with which a user may specify the parameters of a variable format for cell range 401. Input dialog 402 may represent a portion of a larger dialog. When creating a variable format, a user may first select a range of cells such as cell range 401. The user may then request or command that a variable format be applied, causing dialog 402 to be displayed. The user may select a style of format, here "3-Color Scale." Once a style is selected, the appropriate input boxes allow a user to specify the parameters of the variable format to be applied.

For a 3-Color Scale, the input boxes allow a user to specify the method used to assign formats to cells in the range of cells. This is determined by using the Type pulldown for each of "Minimum," "Midpoint," and "Maximum." This pulldown may include choices including (but not limited to) "Lowest Value," "Highest Value," "Number," "Percent," "Percentile," and "Formula."

For "Lowest Value," which is only usable in the "Minimum" column, a program module will evaluate all of the values in the range of cells and select the lowest value as the Minimum, assigning the color selected beneath it. Likewise, "Highest Value," usable only with "Maximum," selects the cell with the highest value in the range, assigning the selected color beneath from the Maximum column.

For "Number," the user actually assigns the value that should receive the particular color associated with the particular column. If the user selects "Number," he or she enters the value to be associated in the input box below the pulldown. If the user selects "Number" for all three columns, then the values entered may be validated to, for example, ensure that the Minimum value is less than the Midpoint value, which is in turn less than the Maximum value.

For "Percent," the user enters a percent to associate with the color of the particular column. A program module may evaluate all of the values within the range of cells in order to determine what values to associate with the percentages entered. For example, if the values in the selected cells range from 0 to 200, then a Minimum value associated with "25%" would be 50. In this example, any cells having values less than 50 may be assigned the same background color as that assigned to Minimum.

"Percentile" differs from "Percent," in that it doesn't determine percentages within the range of values. Rather, "Percentile" examines the set of values contained in the cells, orders them, and uses their ordinality or position within the set of ordered values to determine their percentile. In a set of ten ordered cells, the 40th percentile would always be the fourth cell, regardless of the value contained within it. If a user selects "Percentile" and enters 40, then the cell at the 40th percentile will be assigned the associated color.

Finally, "Formula" allows a user to enter a formula into the Value input box. In most cases, the value used for formatting a cell is one and the same as the value in the cell. Here, however, a formula is evaluated to determine the value to be used for formatting purposes. The values derived from the formula for a range are then treated as the "Number" formatting type. A user may construct a formula using functions, cell references, operators, and so forth to arrive at a format value that is different from the cell value. As noted above, other types of values and algorithms may be used to allow a user to associate a cell range with particular formats.

Once a type is selected for each of the three points of interest, a value optionally entered, and a color selected, a user may push a button or otherwise issue the variable format command to apply it to the selected range of cells. Before accepting the command, a program module may validate the values entered in order to ensure that the Minimum value is less than the Midpoint value, which is less than the Maximum value. Such validation may not be possible until later, however, if values are not immediately known, such as when a formula is used.

Once a variable format is applied, making changes to the values in the selected range of cells may cause the formatting to be updated in some embodiments. If a value changes to become the new "lowest value," then all formatting may adjust appropriately. Likewise, if an additional cell is inserted into the range of cells, it may change the percentages, percentiles, formulas, etc. causing a program module to evaluate and possibly adjust the formats of cells in the range.

Figure 5B:
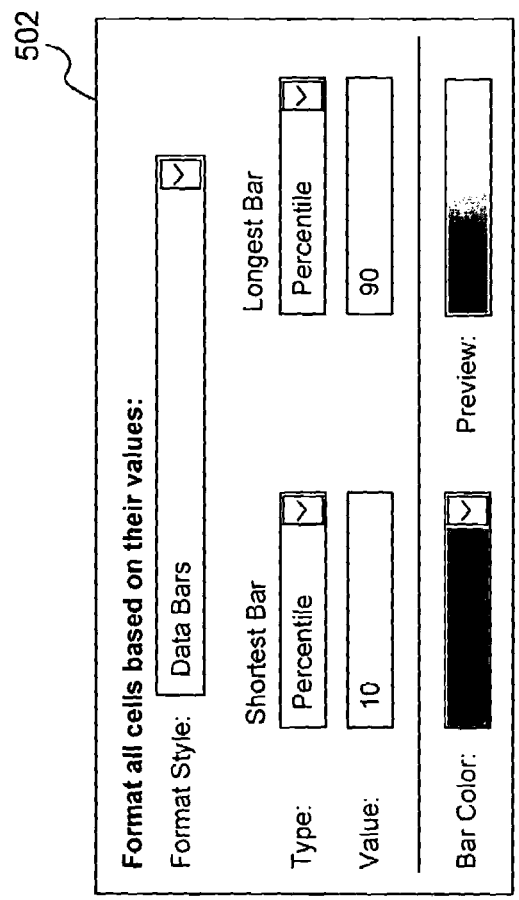
FIG. 5B depicts an input dialog with which a user may specify the variable formatting parameters for FIG. 5A according to one or more embodiments.
Figure 5A:
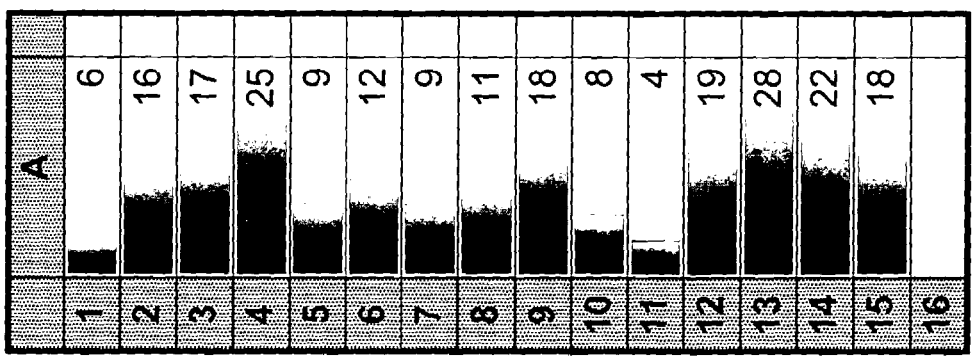
FIG. 5A depicts a range of cells formatted using data bar style variable formatting according to one or more embodiments.

FIG. 5A depicts a range of cells 501 formatted using data bar style variable formatting. Data bars may be depicted within cells and can provide a visual cue for users, indicating larger and smaller values in the range. The data bars within each cell have a length that is determined based on the value in the cell. For example cells A1 and A11 contain the shortest bars, corresponding to the values 6 and 4 respectively. Cells A4 and A13 have the longest bars, corresponding to the values 25 and 28 respectively. Although the data bars shown here are displayed as being filled with a color gradient, other types of data bars may be displayed, including solid bars, bars with patterns, and so forth.

In addition, although horizontal data bars are described here, other types of dynamically modified in-cell shapes may be used, each having an aspect modified depending upon the format value for the cell. Examples may include a pie with an automatically adjusting slice, a vertical data bar, and so forth. Furthermore, data bars may be combined with the color scales described above, such that the color of a bar changes based on the same format value, or possibly using a different format value (e.g., a formula) from the one used to determine the length of a bar.

FIG. 5B depicts an input dialog 502 with which a user may specify the parameters of a variable format for cell range 501. Here, Data Bars have been selected as the format style for the range of cells 501. Dialog 502 enables a user to set the format values that will be assigned to the shortest and longest data bars. Furthermore, the dialog allows the user to manually set the color of the bars. As with dialog 402, upon entering the variable format command, some form of input validation may be performed.

FIG. 6A depicts a range of cells 601 formatted using icon style variable formatting. Icons may be associated with subsets of the range of values associated with range of cells 601. Icons may come in groups of three, four, five, or more. Here, pie icons have been inserted by a program module into individual cells within the range of cells 601. The pie icons here, being a set of 5 distinct icons, differ from the adjustable sliced pie described above in that slices here are preset icons.

FIG. 6B depicts an input dialog 602 with which a user may specify the parameters of a variable format for cell range 601. The Format Style selected for cell range 601 is Icon Sets, allowing the user to select an Icon Set and apply value ranges for each of the icons. For each icon in the set, a user can assign a comparison operator (e.g., $>, \geq, <, \leq$), and select a Type of "Number," "Percent," "Percentile," or "Formula." In this fashion, the user assigns ranges of format values to each icon, and a program module can evaluate the format value and display the appropriate in-cell icon. Additional portions of the dialog may enable a user to modify the icon style, to reverse the icon order, and to replace a cell's value with the determined icon.

Figures 7A, 7B:
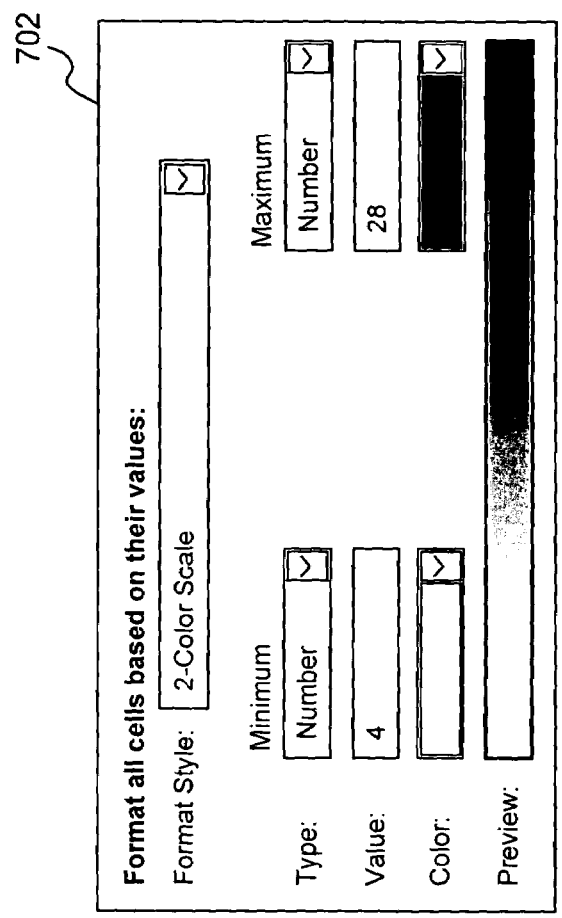
FIG. 7A depicts a range of cells formatted using another form of color scale style variable formatting according to one or more embodiments.
FIG. 7B depicts an input dialog with which a user may specify the variable formatting parameters for FIG. 7A according to one or more embodiments.

FIG. 7A depicts a range of cells 701 formatted using 2-color scale style variable formatting. The 2-color scale depicted works in the same fashion as the 3-color scale, except that no midpoint is provided. FIG. 7B depicts an input dialog 702 with which a user may specify the parameters of a variable format for cell range 701. This dialog again works similarly to dialog 402 described for the 3-color scale, the difference being the lack of a midpoint input.

Figure 9:
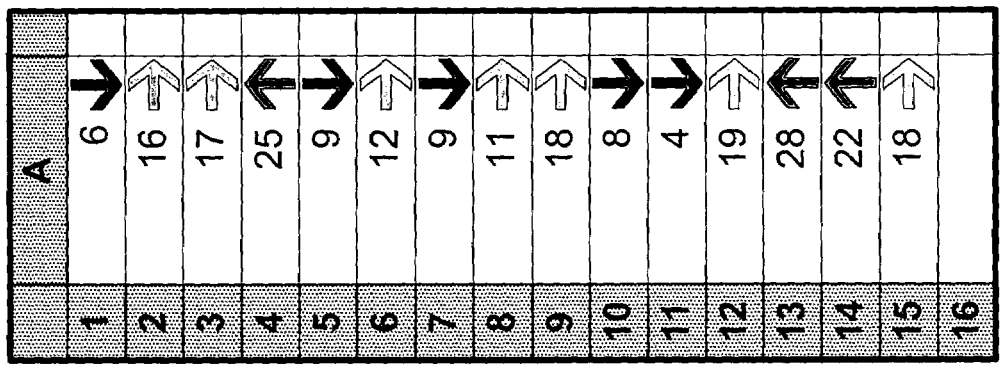
FIGS. 8 and 9 again present additional embodiments of variable formatting applied to cell ranges.
Figure 8:
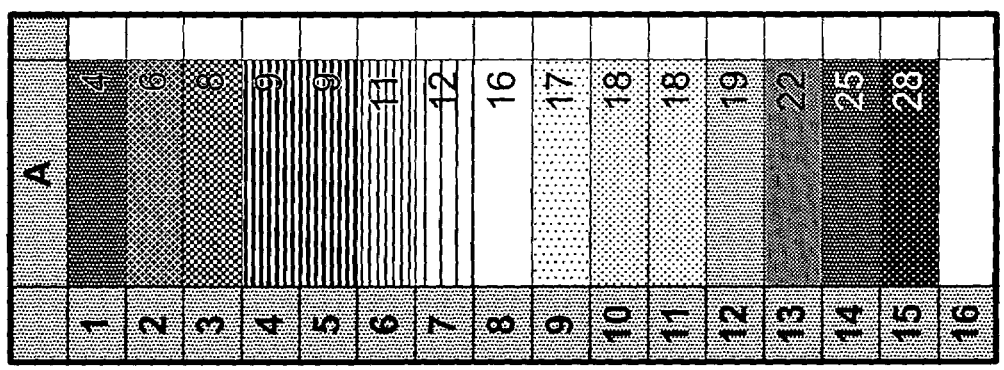

FIGS. 8 and 9 again present cell ranges 801 and 901 displaying cells formatted using additional embodiments. Cell range 801 has been formatted using pattern scales rather than color scales. Such patterns may simplify and enhance black and white printing of cells. Cell range 901 has been formatted using an alternate icon set, here arrow icons instead of pie icons.

Figure 10:
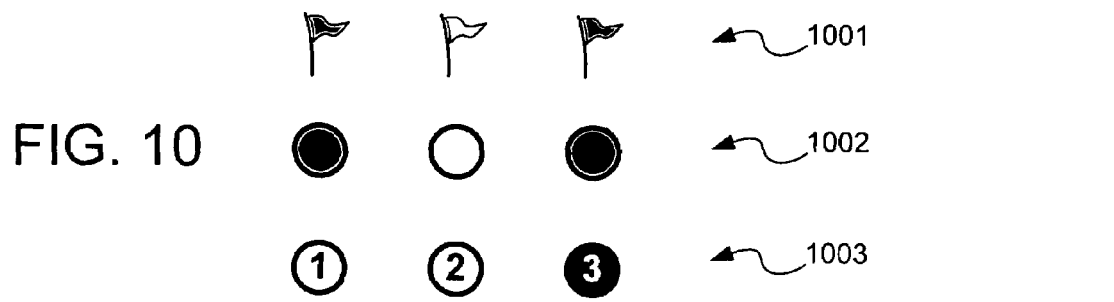
FIGS. 10-12 depict additional icon sets usable with icon style variable formatting according to one or more embodiments.
Figure 11:
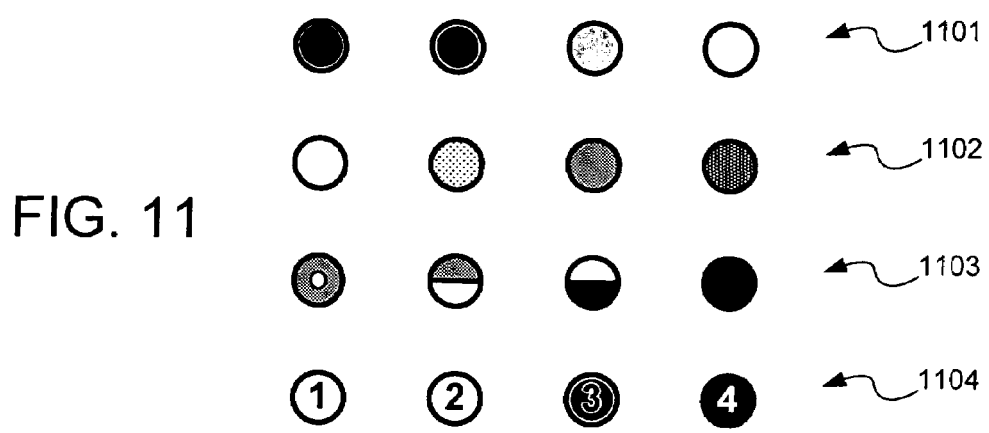
Figure 12:
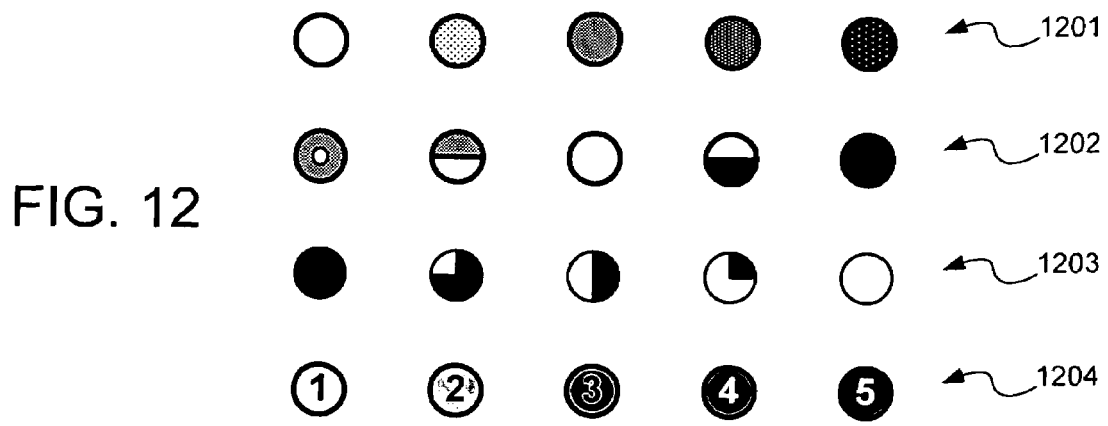

FIGS. 10-12 depict additional alternate icon sets that may be used with icon set style variable formatting. FIG. 10 depicts icon sets using three icons, including flags 1001, stoplights 1002, and digits 1003. FIG. 11 depicts icon sets using four icons, including shaded circles 1101, patterned circles 1102, rating circles 1103, and digits 1104. FIG. 12, finally, depicts icon sets having five icons, including patterned circles 1201, rating circles 1202, pie icons 1203 (previously described), and digits 1204. These icons merely represent additional examples of icon sets, and other icon sets may certainly be available. Moreover, icon sets having six or more icons are certainly possible. For icon sets fewer or greater than five, dialog 702 may simply be modified so as to add additional rows, including the additional icons and settings, or to remove rows as appropriate. Icon sizes may be adjusted along with the size of the cells in which they are to be applied.

Figure 13:
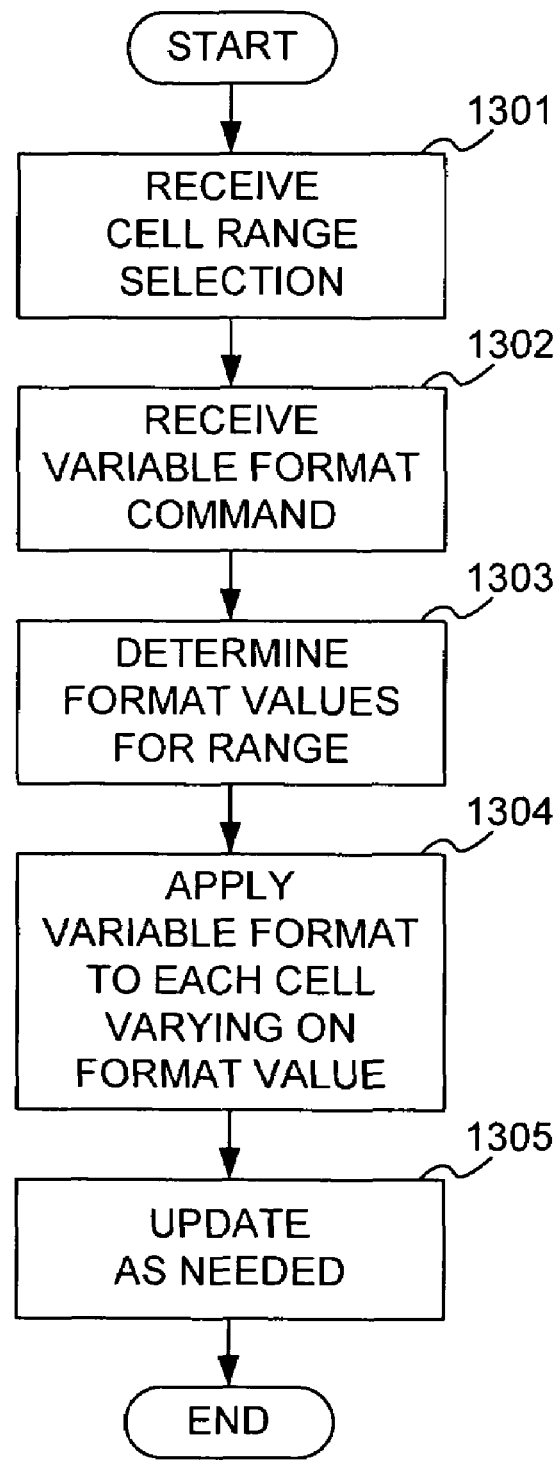
FIG. 13 is a flowchart depicting a method for applying a variable format to a range of cells according to one or more embodiments.

FIG. 13 is a flowchart depicting a method for applying a variable format to a range of cells. Initially, at step 1301, the selection of a range of cells is received. Next a variable format command is received at step 1302. Dialogs 402, 502, 602, and 702 present examples of visual interfaces that may be used to set the parameters associated with a variable format command. Such dialogs may perform simple parameter validations before issuing the command. At step 1303, the range of format values is determined for the range of cells. These values, in many cases, are simply the values stored in the cell, but may vary depending on the use of formulas. Depending on the type of method used to associate values with formats, determinations may be required to find certain percentages or percentiles within the range of format values. Certain formats for certain cells may require further calculations (e.g., selecting a color from a color scale, adjusting the length of a data bar, etc.) before proceeding. Once the formats are determined, they can be applied to each cell by selecting the format from a range of formats based on the format value. At step 1305, changes in the format values or other changes to the range of cells may require updates to cell formats.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings. For example, those skilled in the art will see that although the cells described throughout are associated with spreadsheet applications, other types of applications which display data in tabular format may take advantage of certain embodiments, including database applications, word processing applications, data reporting tools, and so forth.

We claim:

1. A computer-implemented method for formatting a selected range of spreadsheet cells according to a generated spectrum of cell formats the method comprising:
   receiving a selection of a range of spreadsheet cells, wherein each cell of the range of spreadsheet cells includes a respective cell value;
   displaying a format input dialog for receiving formatting criteria for the selected range of spreadsheet cells, wherein receiving formatting criteria includes:
   receiving a selection of a cell format style,
   receiving a selection of a minimum value,
   receiving a selection of a maximum value,
   receiving a selection of a minimum value cell format, and
   receiving a selection of a maximum value cell format,
   based on the minimum value cell format and the maximum value cell format of the received formatting criteria, generating an interval of varying cell formats that vary in a spectrum from the minimum value cell format to the maximum value cell format;
   receiving a selection to format the selected range of spreadsheet cells, wherein formatting includes:
   identifying the respective value for each cell in the range of spreadsheet cells,
   determining whether the respective value for each cell is between the selected minimum value and the selected maximum value, and
   for each respective value between the selected minimum value and the selected maximum value, applying, into the cells of each respective value, a respective cell format determined from a correlation of each respective value to the respective cell format in the spectrum of varying cell formats.

2. The computer-implemented method of claim 1, wherein the cell format style is a color format style, wherein the minimum value cell format is a first color, wherein the maximum value cell format is a second color, wherein the spectrum is a continuous color spectrum from the first color to the second color.

3. The computer-implemented method of claim 1,
   wherein receiving formatting criteria further includes receiving a selection of a midpoint value and receiving a selection of a midpoint value format,
   wherein generating an interval of varying cell formats includes a first and second interval of varying cell formats, wherein the first interval of varying cell formats varies in a first spectrum from the minimum value cell format to the midpoint value cell format,
   wherein the second interval of varying cell formats varies in a second spectrum from the midpoint value cell format to the maximum value cell format,
   wherein formatting further includes identifying the respective value for each cell in the range of spreadsheet cells and determining whether the respective value for each cell is between the selected minimum value and the selected midpoint value or is between the selected midpoint value and the selected maximum point value,
   wherein for each respective value between the selected minimum value and the selected midpoint value, applying, into the cells of each respective value, a respective cell format determined from a correlation of each respective value to the respective cell format in the first spectrum from the minimum value cell format to the midpoint value cell format,
   wherein for each respective value between the selected midpoint value and the selected maximum value, applying, into the cells of each respective value, a respective cell format determined from a correlation of each respective value to the respective cell format in the second spectrum from the midpoint value cell format to the maximum value cell format.

4. The computer-implemented method of claim 3, wherein the cell format style is a color format style, wherein the minimum value cell format is a first color, wherein the midpoint value cell format is a second color, wherein the maximum value cell format is a third color, wherein the first spectrum is a continuous color spectrum from the first color to the second color, wherein the second spectrum is a continuous color spectrum from the second color to the third color.

5. The computer-implemented method of claim 2, wherein the cell format style is a data bar format style, wherein the minimum value cell format is a first length of a data bar, wherein the maximum value cell format is a second length of a data bar, wherein the spectrum is a continuous spectrum of lengths from the first length to the second length.

6. The computer-implemented method of claim 2, wherein the cell format style is a pie chart icon format style, wherein the minimum value cell format is an empty pie chart, wherein the maximum value cell format is a full pie chart, wherein the spectrum is an incremental spectrum of fill amounts from the empty pie chart to the full pie chart.

7. The computer-implemented method of claim 2, wherein the cell format style is an icon set format style, wherein the minimum value cell format is a first icon format, wherein the maximum value cell format is a second icon format, wherein the spectrum is an incremental spectrum of icon formats from the first icon format to the second icon format.

8. The computer-implemented method of claim 2, wherein the minimum value and the maximum value are numbers.

9. The computer-implemented method of claim 2, wherein the minimum value and the maximum value are percentages.

10. The computer-implemented method of claim 2, wherein the minimum value and the maximum value are percentile.

11. The computer-implemented method of claim 2, wherein the minimum value and the maximum value are formulas.

12. A computer readable storage medium having computer executable instructions for formatting a selected range of cells according to a generated spectrum of cell formats, the instructions comprising:
receiving a selection of a range of cells, wherein each cell of the range of cells includes a respective cell value;
receiving formatting criteria for the selected range of cells, wherein receiving formatting criteria includes:
receiving a selection of a cell format style,
receiving a selection of a minimum value,
receiving a selection of a maximum value,
receiving a selection of a minimum value cell format, and
receiving a selection of a maximum value cell format,
based on the minimum value cell format and the maximum value cell format of the received formatting criteria, generating an interval of varying cell formats that vary in a spectrum from the minimum value cell format to the maximum value cell format;
determining whether the respective value for each cell is between the selected minimum value and the selected maximum value; and
for each respective value between the selected minimum value and the selected maximum value, applying, into the cells of each respective value, a respective cell format determined from a correlation of each respective value to the respective cell format in the spectrum of varying cell formats.

13. The computer readable storage medium of claim 12, wherein the cell format style is a color format style, wherein the minimum value cell format is a first color, wherein the maximum value cell format is a second color, wherein the spectrum is a continuous color spectrum from the first color to the second color.

14. The computer readable storage medium of claim 12, wherein the cell format style is a data bar format style, wherein the minimum value cell format is a first length of a data bar, wherein the maximum value cell format is a second length of a data bar, wherein the spectrum is a continuous spectrum of lengths from the first length to the second length.

15. The computer readable storage medium of claim 12, wherein the cell format style is a pie chart icon format style, wherein the minimum value cell format is an empty pie chart, wherein the maximum value cell format is a full pie chart, wherein the spectrum is an incremental spectrum of fill amounts from the empty pie chart to the full pie chart.

16. The computer readable storage medium of claim 12, wherein the cell format style is an icon set format style, wherein the minimum value cell format is a first icon format, wherein the maximum value cell format is a second icon format, wherein the spectrum is an incremental spectrum of icon formats from the first icon format to the second icon format.

17. A system for formatting a selected range of cells according to a generated spectrum of cell formats, the instructions comprising:
a processor; and
a computer readable medium having computer executable instructions stored thereon wherein the instructions cause the processor to execute for:
receiving a selection of a range of cells, wherein each cell of the range of cells includes a respective cell value;
receiving formatting criteria for the selected range of cells, wherein receiving formatting criteria includes:
receiving a selection of a cell format style,
receiving a selection of a minimum value,
receiving a selection of a maximum value,
receiving a selection of a minimum value cell color format, and
receiving a selection of a maximum value cell color format,
based on the minimum value cell color format and the maximum value cell color format of the received formatting criteria, generating an interval of varying cell color formats that vary in a color spectrum from the minimum value cell color format to the maximum value cell color format;
determining whether the respective value for each cell is between the selected minimum value and the selected maximum value; and
for each respective value between the selected minimum value and the selected maximum value, applying, into the cells of each respective value, a respective cell color format determined from a correlation of each respective value to the respective cell color format in the color spectrum of varying cell formats.

18. The system of claim 17,
wherein receiving formatting criteria further includes receiving a selection of a midpoint value and receiving a selection of a midpoint value color format,
wherein generating an interval of varying cell color formats includes a first and second interval of varying cell color formats, wherein the first interval of varying cell color formats varies in a first color spectrum from the minimum value cell color format to the midpoint value cell color format, wherein the second interval of varying cell color formats varies in a second color spectrum from the midpoint value cell color format to the maximum value cell color format,
wherein formatting further includes identifying the respective value for each cell in the range of spreadsheet cells and determining whether the respective value for each cell is between the selected minimum value and the selected midpoint value or is between the selected midpoint value and the selected maximum point value,
wherein for each respective value between the selected minimum value and the selected midpoint value, applying, into the cells of each respective value, a respective cell color format determined from a correlation of each respective value to the respective cell color format in the first color spectrum from the minimum value cell color format to the midpoint value cell color format, wherein for each respective value between the selected midpoint value and the selected maximum value, applying, into the cells of each respective value, a respective cell color format determined from a correlation of each respective value to the respective cell color format in the second color spectrum from the midpoint value cell format to the maximum value cell color format.

19. The system of claim 17, wherein the cell format style is a data bar format style, wherein the minimum value cell color format includes a first length of a data bar, wherein the maximum value color cell format includes a second length of a data bar, wherein the color spectrum further includes a continuous spectrum of bar lengths from the first length to the second length.

* * * * *